United States Patent
Drapkin et al.

(10) Patent No.: US 8,730,912 B2
(45) Date of Patent: May 20, 2014

(54) DETERMINING A NON-ACCESS STRATUM MESSAGE COUNT IN HANDOVER

(75) Inventors: Vitaly Drapkin, San Diego, CA (US); Adrian Edward Escott, Reading (GB); Rekha S. Iyer, San Diego, CA (US); Thomas Klingenbrunn, San Diego, CA (US); Kuo-Chun Lee, San Diego, CA (US); Shyamal Ramachandran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 715 days.

(21) Appl. No.: 12/958,234

(22) Filed: Dec. 1, 2010

(65) Prior Publication Data

US 2012/0140731 A1 Jun. 7, 2012

(51) Int. Cl.
*H04W 4/00* (2009.01)
*H04W 36/00* (2009.01)

(52) U.S. Cl.
CPC .......... *H04W 36/0038* (2013.01); *H04W 36/00* (2013.01); *H04W 36/0066* (2013.01)
USPC ........................................................ 370/331

(58) Field of Classification Search
None
See application file for complete search history.

(56) References Cited

U.S. PATENT DOCUMENTS

2011/0092213 A1* 4/2011 Forsberg et al. .............. 455/436

FOREIGN PATENT DOCUMENTS

WO    2009150493 A1    12/2009

OTHER PUBLICATIONS

3rd Generation Partnership Project; Technical Specification Group Services and System Aspects; 3GPP System Architecture Evolution (SAE); Security architecture (Release 9), 3GPP Standard; 3GPP TS 33.401, 3rd Generation Partnership Project (3GPP), Mobile Competence Centre; 650, Route Des Lucioles; F-06921 Sophia-Antipolis Cedex; France, No. V9.5.0, Oct. 6, 2010, pp. 1-105, XP050461869, [retrieved on Oct. 6, 2010].
Ericsson: "NAS Count estimation correction", 3GPP Draft; C1-092568, 3rd Generation Partnership Project (3GPP), Mobile Competence Centre; 650, Route Des Lucioles; F-06921 Sophia-Anti Polis Cedex; France, no. Los Angeles; 20090701, Jul. 1, 2009, XP050349388, [retrieved on Jul. 1, 2009].
International Search Report and Written Opinion—PCT/US2011/061213—ISA/EPO—Apr. 17, 2012.

* cited by examiner

*Primary Examiner* — John Blanton
(74) *Attorney, Agent, or Firm* — Dalei Dong

(57) ABSTRACT

Techniques for deriving message counts based at least in part on a locally stored message count and at least a portion of a message count received from a remote network node are disclosed. The message counts can relate to downlink (DL) non-access stratum (NAS) counts. In one aspect, a device can receive a number of least significant bits of the DL NAS count in a handover message. The device can derive a DL NAS count by utilizing a remaining portion of most significant bits of a locally stored DL NAS count, and can determine whether to increment or decrement the most significant bits based at least in part on a parameter to handle cases where the least significant bits of the locally stored DL NAS count have wrapped due to overflow and/or underflow.

23 Claims, 11 Drawing Sheets

DETERMINING A NON-ACCESS STRATUM MESSAGE COUNT IN HANDOVER

TECHNICAL FIELD

The following description relates generally to wireless communications, and more particularly to facilitating handover between wireless networks.

BACKGROUND

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

Moreover, for example, a device can move throughout a coverage area and can handover communications from one base station to another (e.g., where communication metrics of the other base station are more desirable) to provide seamless wireless network access. In one example, the device can communicate with a base station in an evolved universal mobile telecommunications system (UMTS) terrestrial radio access network (E-UTRAN), such as LTE, and can handover to a base station in a packet switched (PS) or circuit switched (CS) UMTS radio access network (UTRAN). During handover, the E-UTRAN core network can configure security keys for the device in the UTRAN network.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more embodiments and the corresponding disclosure thereof, various aspects are described in connection with deriving a message count utilized by a remote network component based at least in part on a local message count and a portion of the message count received from the remote network. For example, a number of least significant bits (LSBs) of the message count can be received from a remote network node, and a message count can be derived at least in part by utilizing the remaining bits of the local message count, along with the LSBs received from the remote network node. The remaining bits of the local message count can be modified for generating the derived message count based at least in part on a threshold maximum lower difference between the LSBs of the message count received from the remote network node and the corresponding bits of the local message count.

According to one example, a method of wireless communication is provided that includes receiving a portion of a downlink (DL) non-access stratum (NAS) count from a remote network node during handover to a target network, and generating a derived DL NAS count based at least in part on a locally stored DL NAS count and the portion of the DL NAS count received from the remote network node. The method further includes generating one or more security keys for the target network based at least in part on the derived DL NAS count.

In another aspect, an apparatus for deriving a message count is provided that includes at least one processor configured to obtain a portion of a DL NAS count from a remote network node during handover to a target network and to generate a derived DL NAS count based at least in part on a locally stored DL NAS count and the portion of the DL NAS count received from the remote network node. The at least one processor is further configured to generate one or more security keys for the target network based at least in part on the derived DL NAS count. The wireless communications apparatus also includes a memory coupled to the at least one processor.

In another aspect, an apparatus for deriving a message count is provided that includes means for receiving a portion of a DL NAS count from a remote network node during handover to a target network and means for generating a derived DL NAS count based at least in part on a locally stored DL NAS count and the portion of the DL NAS count received from the remote network node. The apparatus further includes means for generating one or more security keys for the target network based at least in part on the derived DL NAS count.

In a further aspect, a computer-program product is provided for deriving a message count including a computer-readable medium having code for causing at least one computer to obtain a portion of a DL NAS count from a remote network node during handover to a target network. The computer-readable medium further includes code for causing the at least one computer to generate a derived DL NAS count based at least in part on a locally stored DL NAS count and the portion of the DL NAS count received from the remote network node, and code for causing the at least one computer to create one or more security keys for the target network based at least in part on the derived DL NAS count.

In yet another aspect, an apparatus for deriving a message count is provided that includes a least significant bit (LSB) DL NAS count receiving component for obtaining a portion of a DL NAS count from a remote network node during handover to a target network. The apparatus further includes a DL NAS count deriving component for generating a derived DL NAS count based at least in part on a locally stored DL NAS count and the portion of the DL NAS count and a universal mobile telecommunications system (UMTS) security key generating component for creating one or more security keys for the target network based at least in part on the derived DL NAS count.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
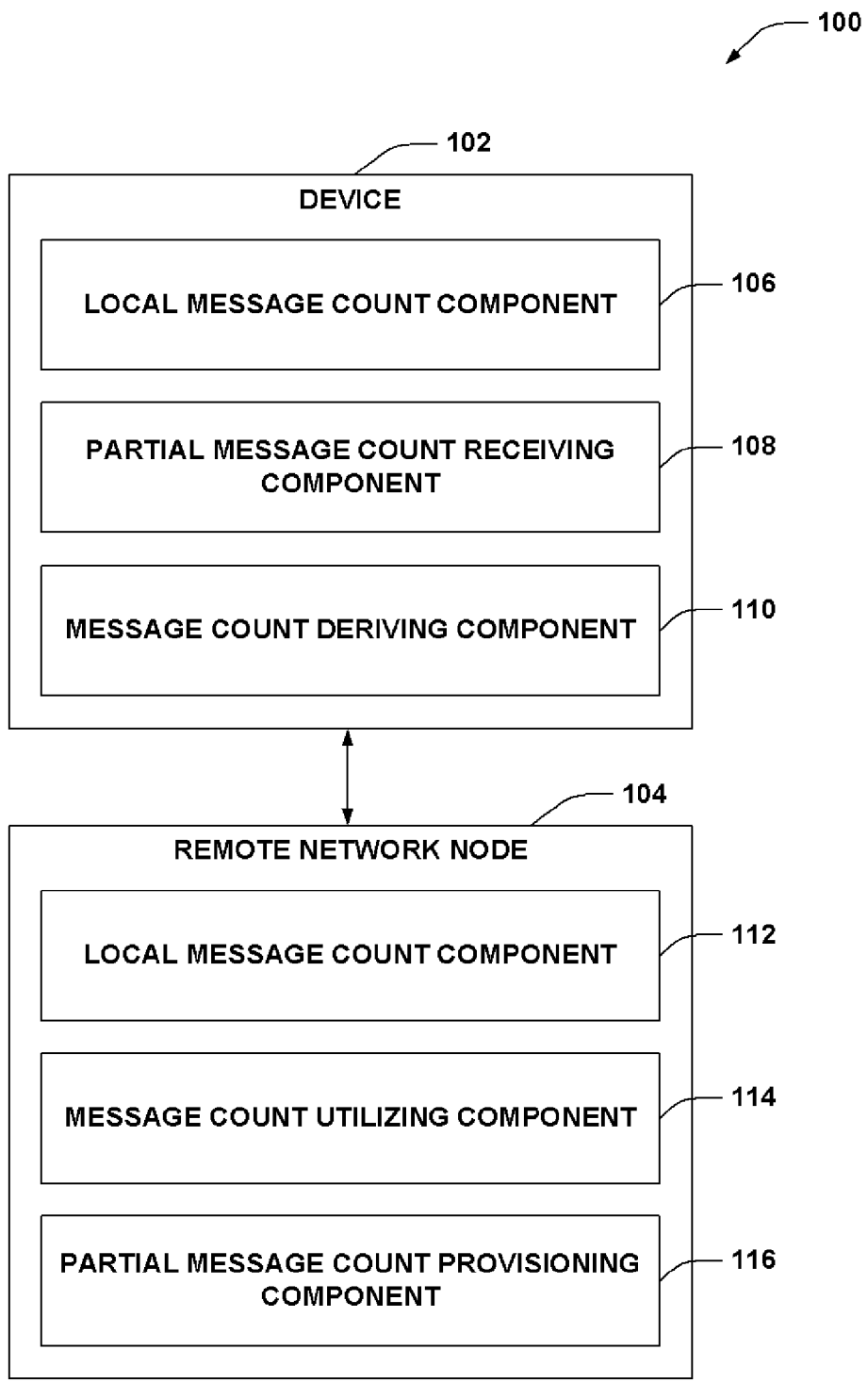
FIG. 1 illustrates an example system for deriving a message count.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described herein, a message count used by a remote network node in one or more functions can be derived by a wireless device based at least in part on a received number of least significant bits (LSBs) of the message count and a local message count of the wireless device. For example, the bits other than the LSBs of the local message count can be utilized for deriving the message count used by the remote network node, while the LSBs of the derived message count can correspond to those received from the remote network node. In addition, the bits of the derived message count other than the LSBs can be modified from the local message count based at least in part on a threshold maximum lower difference between the LSBs of the message count received from the remote network node and similar LSBs of the local message count. For example, modifying the bits can handle the case where the local DL NAS count has wrapped beyond the capacity of the LSBs.

The message count can relate to a downlink (DL) non-access stratum (NAS) count. The remote network node can be an evolved packet core (EPC) network component that generates UMTS security keys from the DL NAS count for handing over a device to a UMTS network. Thus, the wireless device can derive the DL NAS count used by the EPC to generate the UMTS security keys. The wireless device can derive the DL NAS count based at least in part on LSBs of the DL NAS count received from the EPC network component and a local DL NAS count. For example, where the LSBs of the local DL NAS count wrap beyond the limit of values of the LSBs (and thus the value of the LSBs of the local DL NAS count is lower while the local DL NAS count is higher), the remaining bits of the derived DL NAS count can be incremented or decremented based at least in part on a parameter (e.g., a threshold maximum lower difference between the LSBs received and similar LSBs of the local DL NAS count). With the correct DL NAS count, the wireless device can generate the UMTS security keys utilized by the EPC to facilitate seamless handover of the device to the UMTS network.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the DL and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, illustrated is a wireless communication system 100 that facilitates deriving a message count utilized by a remote network node (also referred to as a "network message count"). System 100 includes a device 102 that can communicate with a remote network node 104 to receive wireless network access. For example, device 102 can be a UE, modem (or other tethered device), a portion thereof, or substantially any device that can communicate with one or more base stations or other devices in a wireless network. In addition, remote network node 104 can be a macrocell, femtocell or picocell base station, a relay node, a mobile base station, a mobile device (e.g., communicating with device 102 in peer-to-peer or ad-hoc mode), a network component (e.g., a gateway, mobility management entity (MME), and/or the like), a portion thereof, and/or substantially any device that can communicate with one or more devices.

As depicted, device 102 can comprise a local message count component 106 that can store a local message count related to messages received from a remote network node and can increment the local message count upon receiving the messages, a partial message count receiving component 108 that can obtain at least a portion of a message count from the remote network node, and a message count deriving component 110 that can compute a message count used at the remote network node based at least in part on the local message count and the portion of the message count. Remote network node 104 can include a local message count component 112 that can store a local message count related to messages transmitted to a device and can increment the local message count upon transmitting messages to the device, a message count utilizing component 114 that can leverage the local message count in one or more functions, and a partial message count provisioning component 116 that can provide at least a portion of the local message count utilized in the one or more functions to the device.

According to an example, remote network node 104 can communicate messages to device 102. Local message count component 112 can increment a message counter at remote network node 104 for each message transmitted, and local message count component 106 can increment a message counter at device 102 for each message received. Message count utilizing component 114 can, in one example, utilize a message count in one or more functions and device 102 can determine the message count utilized as part of the one or more functions. Thus, for example, partial message count provisioning component 116 can communicate a portion of the network message count to device 102. As described, for example, this can be a number of LSBs of the message count local to remote network node 104.

In this example, partial message count receiving component 108 can obtain the portion of the message count (e.g., the number of LSBs). Message count deriving component 110 can compute a derived message count based at least in part on the message count local to device 102 and the portion of the network message count received from remote network node 104. For example, as described, message count deriving component 110 can utilize a portion of the message count local to device 102 for the remaining portion of the derived message count, where the portion utilized is not included in the portion of the message count received from remote network node 104. In addition, message count deriving component 110 can utilize the portion of the message count received from remote network node 104 for the remainder of the derived message count (e.g., the received LSBs).

In one example, partial message count provisioning component 116 can provide n LSBs of the message count to device 102, where n is a positive integer and less than the total number of bits of the message count. Partial message count receiving component 108 can obtain the n LSBs of the message count. In this example, message count deriving component 110 can derive the message count utilized at remote network node 104 based at least in part on utilizing the remaining bits of the message count local to device 102 and the n LSBs of the message count received from remote network node 104. In one example, message count deriving component 110 determines whether to modify the remaining bits of the message count local to device 102 as utilized in the derived message count based at least in part on a parameter related to a threshold difference between the message count received from remote network node 104 and the message count local to device 102 (e.g., to handle the case where a value of the LSBs of the local message count has wrapped and is less than a value of the received LSBs, while the overall local message count is greater than the message count at remote network node 104, or vice versa).

Figure 2:
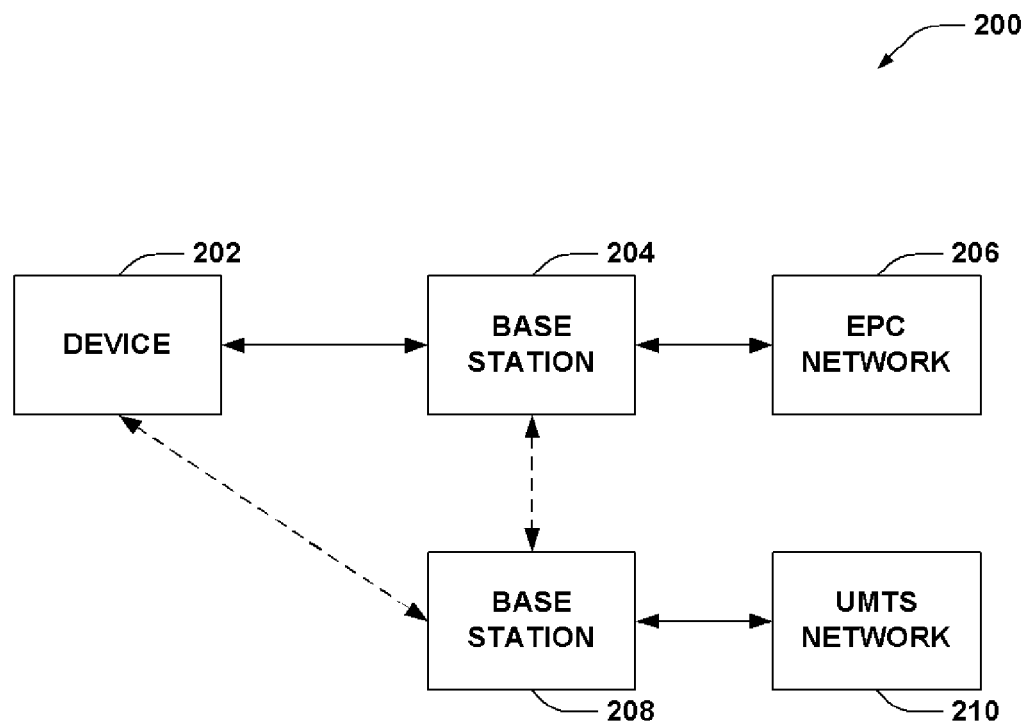
FIG. 2 illustrates an example system for performing handover of device communications between different types of networks.

Turning to FIG. 2, an example wireless communications system 200 is depicted that facilitates handing over device communications from an evolved packet core (EPC) network to a UMTS network. System 200 can include a device 202 that communicates with a base station 204 to receive access to an EPC network 206, such as LTE. In addition, system 200 includes a base station 208 that provides access to a UMTS network 210. As described, device 202 can be a UE, modem, etc., and base stations 204 and 208 can be macrocell, femtocell, picocell base stations, etc.

In an example, device 202 can communicate with the EPC network 206 via base station 204 and can be instructed to handover communications to base station 208. In one example, in LTE, device 202 can send periodic measurement reports to base station 204 regarding communications metrics (e.g., signal-to-noise ratio (SNR), etc.) of neighboring base stations, such as base station 208. As device 202 moves closer to base station 208 and the SNR of base station 208 becomes better than that of the base station 204 within a certain threshold (e.g., based on the measurement report), for example, handover of device 202 communications to base station 208 can be initiated. UMTS network 210 can be a packet switched (PS) or circuit switched (CS) network, and EPC network 206 can accordingly generate security keys for the UMTS network 210, which device 202 can utilize to facilitate seamless handover from base station 204 to base station 208.

EPC network 206 can generate the security keys for UMTS network 210 based at least in part on a DL NAS count, related to NAS messages transmitted from EPC network 206 to device 202, and EPC security keys, such as E-UTRAN access security management key entity, $K_{AMSE}$. Device 202 can store the EPC security keys for use when communicating with EPC network 206. However, the DL NAS count at device 202 can be different than the DL NAS count utilized to generate the UMTS keys (e.g., due in part to NAS messages sent to device 202 following generating the UMTS keys, etc.). In this regard, base station 204 can provide device 202 with a portion of the related DL NAS count in a handover command. Thus, device 202 can receive the portion of the DL NAS count in the handover command, and can generate the security keys for the UMTS network 210 based at least in part on deriving the remainder of the DL NAS count.

Device 202 can also store and maintain a local DL NAS count (also referred to herein as a locally stored DL NAS count), as described, and can thus utilize a portion of the local DL NAS count to derive the DL NAS count based additionally on the portion of the DL NAS count received from base station 204. In one example, the DL NAS count can be m bits, where m is a positive integer greater than one. Base station 204 can send device the n LSBs of the DL NAS count from EPC network 206, where $0 < n \leq m$. Thus, device 202 can utilize the m−n most significant bits (MSBs) of the local DL NAS count with the n LSBs received from base station 204 to derive the DL NAS count.

In addition, device 202 can determine whether to modify the m−n MSBs of the derived DL NAS count based at least in part on a parameter related to a threshold maximum lower difference between the n LSBs of the DL NAS count received from base station 204 and the n LSBs of the local DL NAS count. For example, the parameter can allow for detection of a wrap case where the greater of the DL NAS counts wraps beyond $2^n$ (e.g., referred to herein as overflow), and/or the lesser of the DL NAS counts wraps below 0 (e.g., referred to herein as underflow). Upon deriving the DL NAS count, device 202 can generate the UMTS security keys based at least in part on the derived DL NAS count, and can utilize the UMTS security keys in subsequent communications with UMTS network 210 to facilitate seamless handover thereto.

Figure 3:
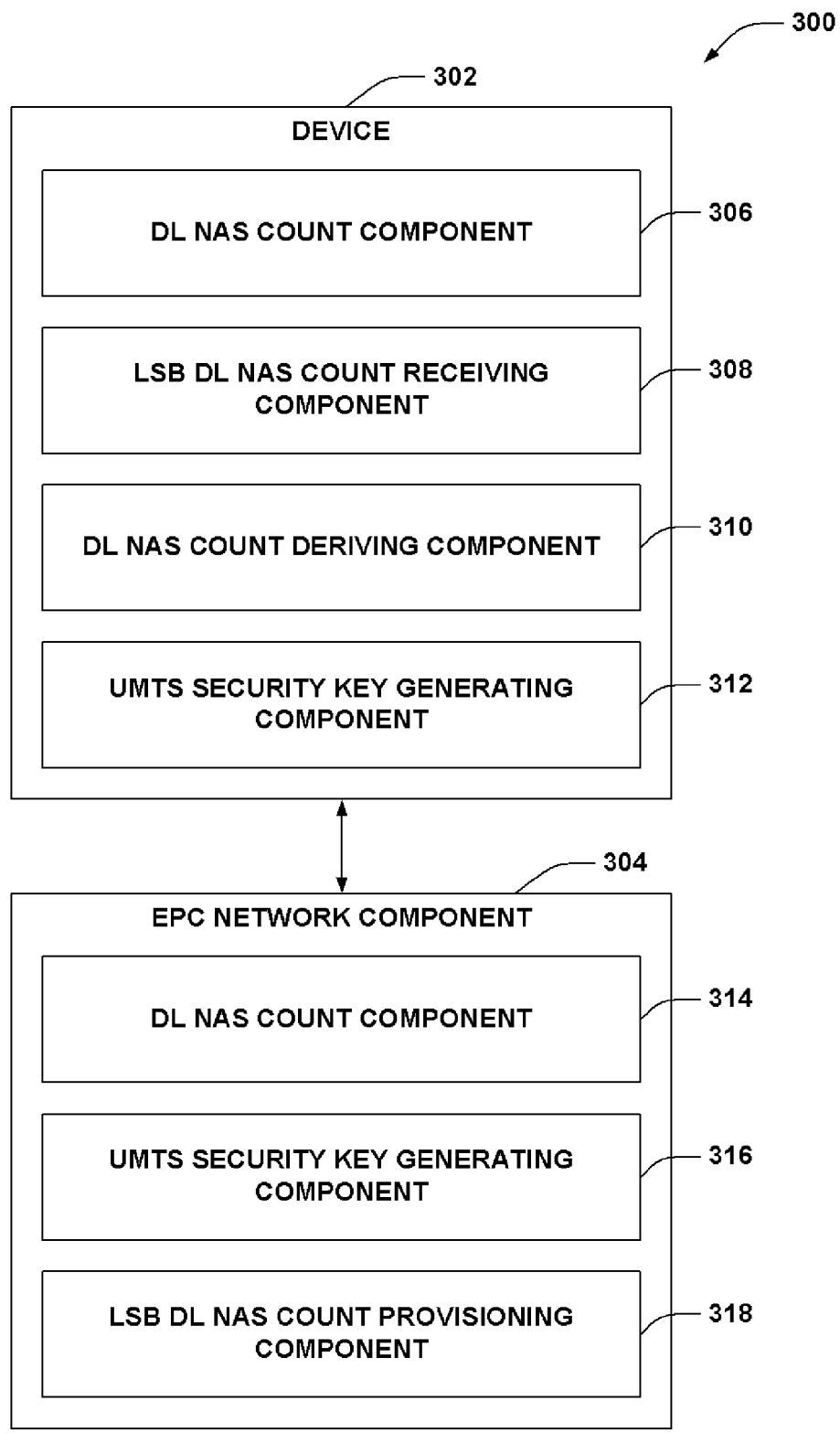
FIG. 3 illustrates an example system for deriving a downlink (DL) non-access stratum (NAS) count.

FIG. 3 shows an exemplary wireless communication system 300 that facilitates deriving a DL NAS count for generating UMTS security keys. System 300 comprises a device 302 that communicates with an EPC network component 304 (e.g., through one or more other devices, such as a base station, peer-to-peer device, and/or the like). EPC network component 304 can be a gateway, MME, or similar component, for example, that maintains a DL NAS count and performs one or more functions based at least in part on the DL NAS count.

Device 302 can comprise a DL NAS count component 306 that maintains a local DL NAS count related to receiving DL NAS messages in an EPC network, and an LSB DL NAS count receiving component 308 for obtaining n LSBs of a DL NAS count in an UMTS handover command. Device 302 also comprises a DL NAS count deriving component 310 that generates a derived DL NAS count based at least in part on the local DL NAS count and the obtained n LSBs of the DL NAS count in the UMTS handover command, and a UMTS security key generating component 312 for creating UMTS security keys based at least in part on the derived DL NAS count. EPC network component 304 can comprise a DL NAS count component 314 that maintains a local DL NAS count related to transmitting DL NAS messages to a device, a UMTS security key generating component 316 that creates UMTS security keys for the device based at least in part on a DL NAS count, and a LSB DL NAS count provisioning component 318 that communicates n LSBs of the local DL NAS count to the device.

Device 302 can communicate with EPC network component 304 and receive DL NAS messages therefrom (e.g., via a base station). For each DL NAS message transmitted by EPC network component 304, DL NAS count component 314 can increment a DL NAS count local to EPC network component 304. For each DL NAS message received at device 302, DL NAS count component 306 can increment a DL NAS count local to device 302. Thus, DL NAS count components 206 and 314 can maintain a similar DL NAS count. As described, for example, a base station facilitating communication between device 302 and EPC network component 304 can assist in a handover of device 302 to a UMTS network base station. In this regard, UMTS security key generating component 316 can generate UMTS security keys for the device 302 (e.g., based at least in part on a request for such keys from the base station or otherwise).

UMTS security key generating component 316 can create the UMTS security keys based at least in part on the DL NAS count and security keys used for EPC network communications by the EPC network component 304 and device 302. Thus, in an example, LSB DL NAS count provisioning component 318 can transmit n LSBs of the local DL NAS count to device 302 to facilitate generating the UMTS security keys, since the DL NAS count used to generate the security keys can vary from the DL NAS count at device 102, as described (e.g., where EPC network component 304 sends additional NAS messages to device 302 between the time it generates the security keys and the time it sends the handover command). LSB DL NAS count receiving component 308 can obtain the n LSBs of the DL NAS count, and DL NAS count deriving component 310 can generate a derived DL NAS count based at least in part on the n LSBs as received. As described, for example, DL NAS count deriving component 310 can additionally utilize the m−n MSBs of the local DL NAS count to generate the derived DL NAS count (e.g., where the DL NAS count has m total bits).

In one aspect, DL NAS count can be 24 bits, and LSB DL NAS count provisioning component 318 can send the 4 LSBs of the DL NAS count at EPC network component 304 to device 302. In an exemplary case, the DL NAS count at device 302 can have a format similar to the following:

| 16-bit Overflow Counter (X) | 4-MSB Sequence Number (Y1) | 4-LSB Sequence Number (Y2) |
|---|---|---|

DL NAS count deriving component 310 can replace Y2 with the 4 LSBs received from EPC network component 304.

Moreover, DL NAS count deriving component 310 can determine whether to modify at least the Y1 and/or X portions of the derived DL NAS count based at least in part on comparing Y2 of the local DL NAS count and the 4 LSBs received from the EPC network component 304 with a parameter, C, related to a threshold maximum lower difference between the LSB values (e.g., a maximum lower difference of the DL NAS count at EPC network component 304 based on the received 4 LSBs). For example, C can be substantially any value such that $0 \leq C < 2^n$, where n is 4 in this example. In this regard, DL NAS count deriving component 310 can generate the DL NAS count based at least in part on the following, given the format above, and where Z is the 4 LSBs received from EPC network component 304:

Y'=(Y2−C) mod 16:
  Where Y2≥Y', e.g., Y' does not wrap:
    If Y2≤Z≤15 (e.g., EPC network component 304 has a larger value for the 4 LSB than device 302), then the derived DL NAS count is X∥Y1∥Z;
    If Y'<Z<Y2 (e.g., EPC network component 304 has a smaller value for the 4 LSB than device 302), then the derived DL NAS count is X∥Y1∥Z;
    If 0≤Z≤Y' (e.g., EPC network component 304 has a larger value for the 4 LSB than device 302), then the derived DL NAS count is X∥Y1+1∥Z, (if Y1+1 has overflow, then derived DL NAS derived can be X+1∥Y1−15∥Z).
  Where Y2<Y', e.g., Y' wraps:
    If Y2≤Z≤Y' (e.g., EPC network component 304 has a larger value for the 4 LSB than device 302), then the estimated DL NAS count is X∥Y1∥Z;
    If 0≤Z<Y2 (e.g., EPC network component 304 has a smaller value for the 4 LSB than device 302), then the estimated DL NAS count is X∥Y1∥Z;
    If Y'<Z≤15 (e.g., EPC network component 304 has a smaller value for the 4 LSB than device 302), then the estimated DL NAS count is X∥Y1−1∥Z, (if Y1−1 has underflow, then estimated DL NAS count can be X−1∥Y1+15∥Z).

The above notation a∥b∥c is concatenation of three variables from MSB to the LSB, as described above. In any case, UMTS security key generating component 312 can create UMTS security keys based at least in part on the derived DL NAS count (e.g., and security keys used in communicating with EPC network component 304). In addition, UMTS security key generating component 312 can utilize the UMTS security keys in communicating with a UMTS network component following handover.

Figure 4:
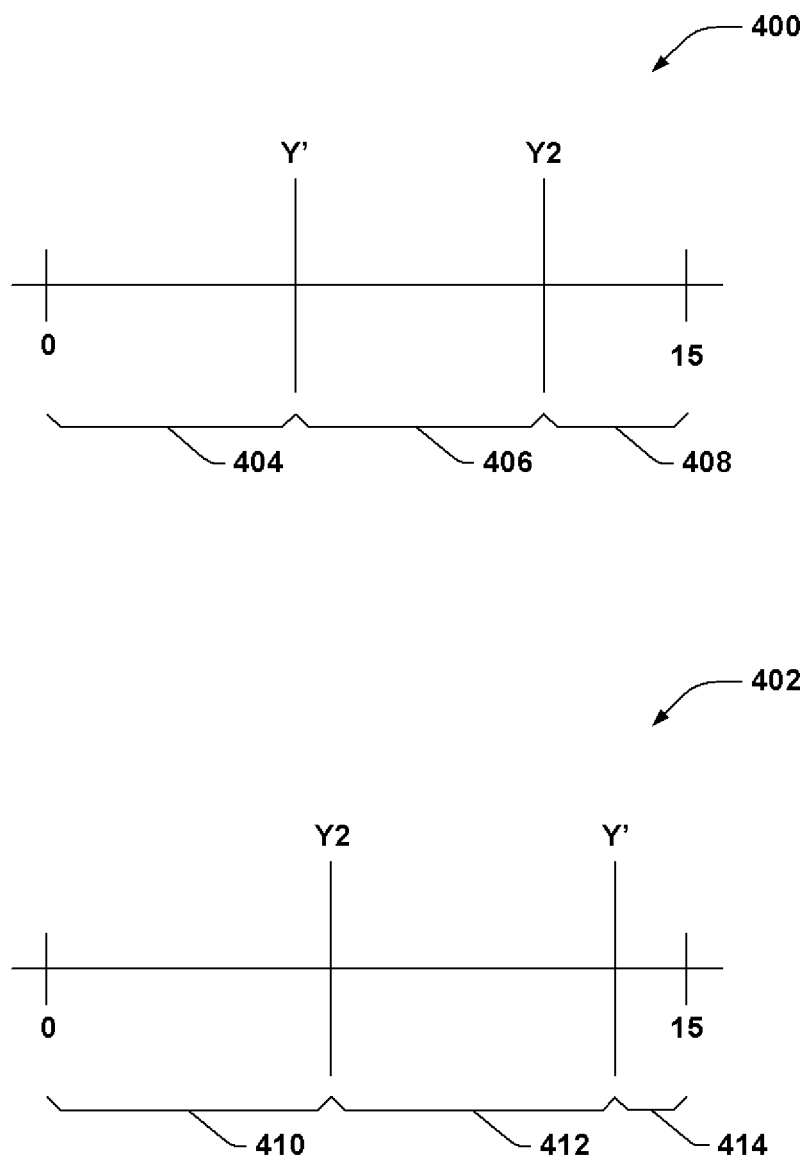
FIG. 4 illustrates aspects of a process for deriving a DL NAS count.

Turning to FIG. 4, charts 400 and 402 illustrate aspects of the process for determining DL NAS count described above. Chart 400 shows the case where Y2 Y', for some arbitrary values of Y' and Y2. In this case, Y' does not wrap, meaning Y2−C does not span past 0. In this case, where Z falls within range 404 (e.g., inclusive of Y' and 0), the DL NAS count at the EPC network component is larger, and thus, Y1 is incremented in the derived DL NAS count. If incrementing Y1 causes overflow of Y1, the overflow counter X can be incremented, and $2^n-1$ can be subtracted from Y1, where n is the number of bits of Z. Where Z falls within the range 406 (e.g., exclusive of Y' and Y2), the DL NAS count at the EPC network component is smaller, and thus no change is required to Y1. Where Z falls within the range of 408 (e.g., inclusive of Y2 and 15), the DL NAS count at the EPC network component is larger, and similarly no change is required to Y1.

Chart 402 shows the case where Y2<Y'. In this case, Y' wraps, meaning Y2−C spans past 0, and performing modulo 16 results in a value greater than Y2 (though Y2−C is negative). In this case, where Z falls within range 410 (e.g., inclusive of Y2 and 0), the DL NAS count at the EPC network component is smaller, and thus, no change is required to Y1. Where Z falls within the range 412 (e.g., exclusive of Y2 and Y'), the DL NAS count at the EPC network component is larger, and thus no change is required to Y1. Where Z falls within the range of 414 (e.g., inclusive of Y' and 15), the DL NAS count at the EPC network component is smaller, and Y1 is decremented in the derived DL NAS count. If decrementing Y1 causes underflow of Y1, the overflow counter X can be decremented, and $2^n-1$ can be added to Y1.

Figure 5:
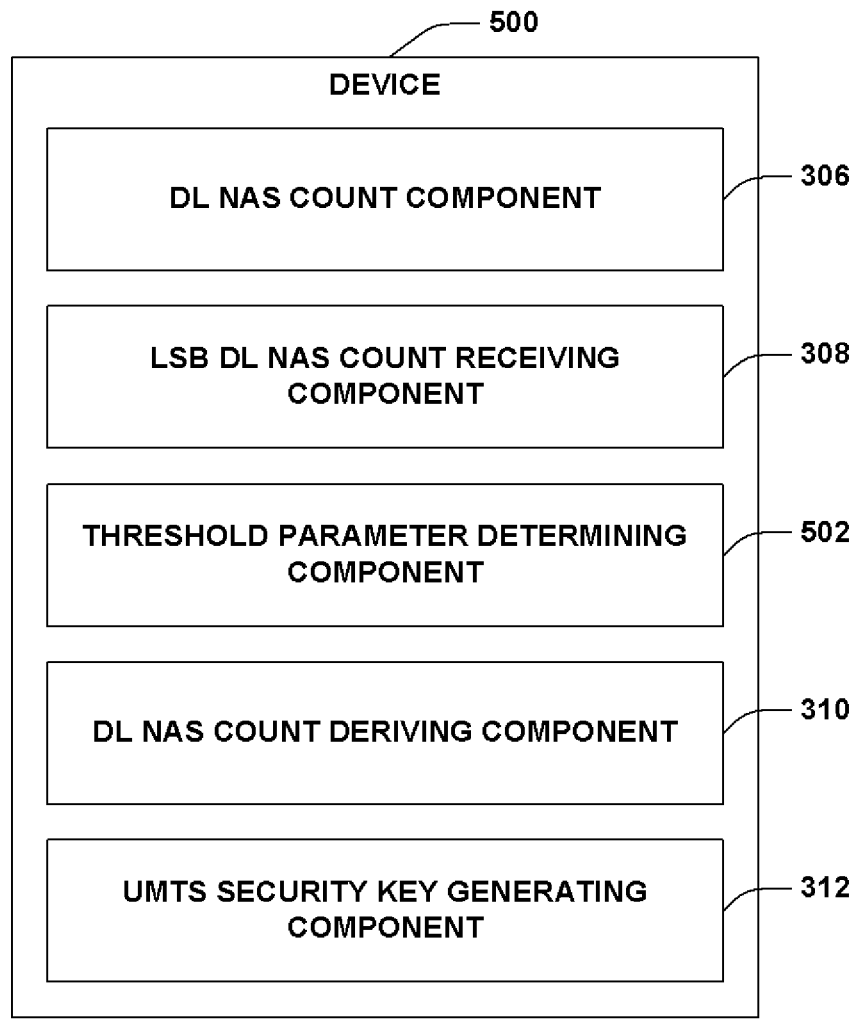
FIG. 5 illustrates an example system that generates a parameter to utilize in deriving a DL NAS count.

FIG. 5 shows an exemplary device 500 that facilitates deriving a DL NAS count based at least in part on a local DL NAS count, received LSBs of a DL NAS count, and a parameter related to a threshold maximum lower difference between the two. Device 500, as described, can be a UE, modem (or other tethered device), etc. Device 500 can comprise a DL NAS count component 306 that maintains a local DL NAS count related to receiving DL NAS messages in an EPC network, an LSB DL NAS count receiving component 308 that obtains n LSBs of a DL NAS count in an UMTS handover command, and a threshold parameter determining component 502 that obtains a parameter related to a threshold maximum lower difference between the local DL NAS count, and the n received LSBs of a DL NAS count. Device 500 also comprises a DL NAS count deriving component 310 that generates a derived DL NAS count based at least in part on the local DL NAS count and the n LSBs of the DL NAS count obtained in the UMTS handover command, and a UMTS security key generating component 312 that creates UMTS security keys based at least in part on the derived DL NAS count, as described.

In one aspect, device 500 can communicate with an EPC network component (not shown) receiving DL NAS messages therefrom (e.g., via a base station). For each DL NAS message received at device 500, DL NAS count component 306 can increment a DL NAS count local to device 500. As described, for example, LSB DL NAS count receiving component 308 can obtain the n LSBs of a DL NAS count from an EPC network component (e.g., via a base station) in a handover command or similar message. In addition, for example, threshold parameter determining component 502 can obtain a parameter, C, related to a threshold maximum lower difference between the n LSBs of the local DL NAS count and the n LSBs received at LSB DL NAS count receiving component 308, such that $0 \leq C < 2^n$. In this regard, DL NAS count deriving component 310 can generate a derived DL NAS count based at least in part on the n LSBs as received, the local DL NAS count, and the parameter, as described above.

In an example, threshold parameter determining component 502 can retrieve the C parameter from a hardcoding, network specification, configuration (e.g., signaled to device 500 in other network communications, stored in removable media of device 500, etc.), and/or the like, or determine the parameter based on other information received from a hardcoding, network specification, configuration, and/or the like. For example, C=0 can be specified by threshold parameter determining component 502 to handle where the DL NAS count at the EPC network component is mostly larger than or equal to the DL NAS count at device 500. In another example, $C=2^n-1$ can be specified by threshold parameter determining component 502 to handle where the DL NAS count at device 500 is mostly larger than or equal to the DL NAS count at the EPC network node. In this regard, for example, threshold parameter determining component 502 can specify $C=2^n/2$ to handle both cases above at substantially equal probability.

In another example, threshold parameter determining component 502 can compute the parameter based at least in part on one or more communication metrics related to communications with the EPC network node. In one example, threshold parameter determining component 502 can determine a number of NAS messages received from the EPC network component in a time interval prior to the handover command. In this regard, C can be set as a non-decreasing function of the number of NAS messages. Moreover, threshold parameter determining component 502 can set the time interval to around a time when handover is initiated to the time the handover message is sent from the EPC network component. This can be based, for example, on a time interval received from the EPC network component (e.g., in the handover message), an analysis of one or more time intervals for previous handover commands, which can include an analysis of a difference in the DL NAS count at device 500 and that derived by DL NAS count deriving component 310 for the previous handover commands, and/or the like. In any case, threshold parameter determining component 502 can determine a number of NAS messages from the start of the time interval to the time at which the handover command is received in determining the parameter value. In another example, threshold parameter determining component 502 can set the time interval according to a hardcoding, network specification, configuration, etc.

Figure 6:
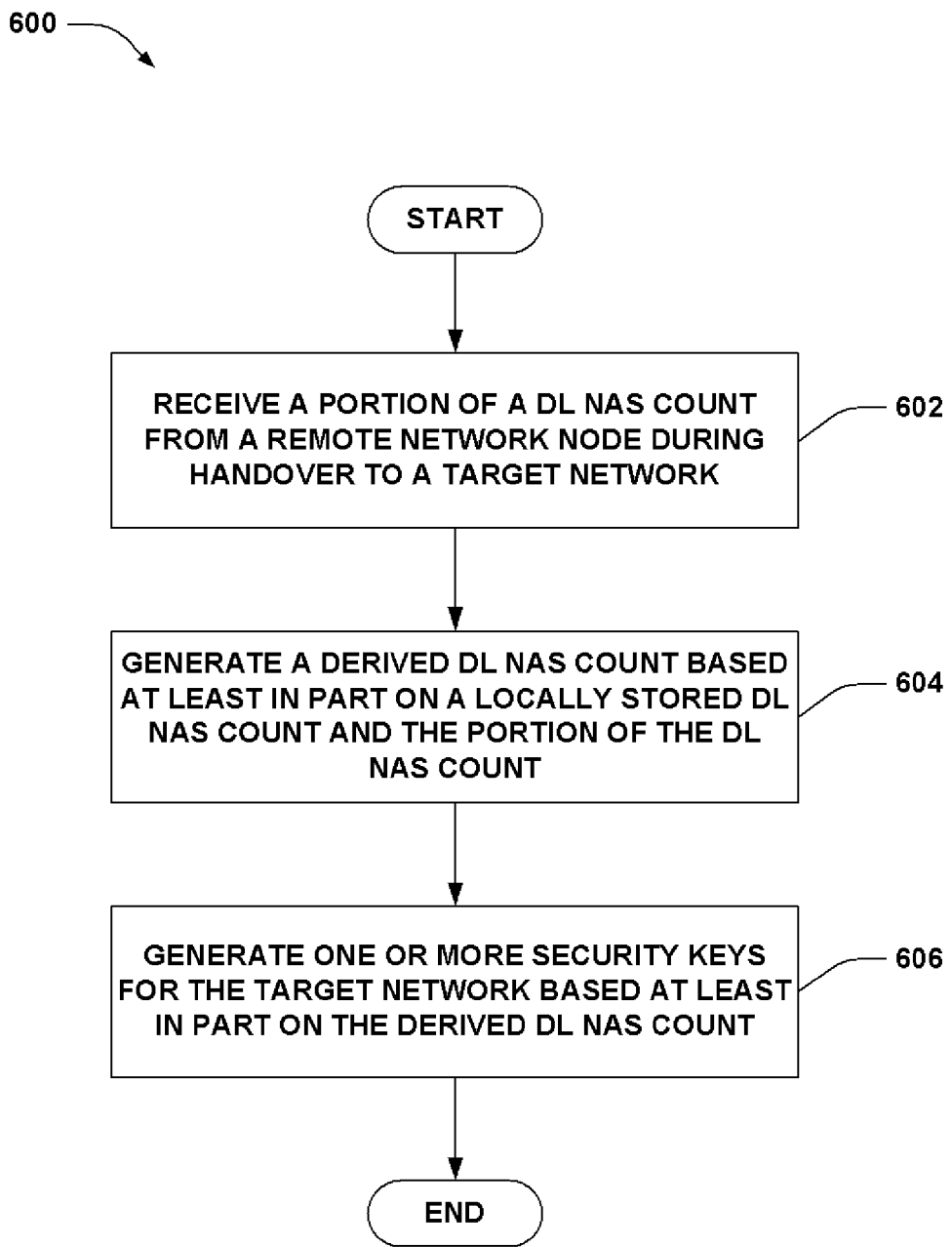
FIG. 6 illustrates an example methodology that generates security keys from a derived DL NAS count.
Figure 7:
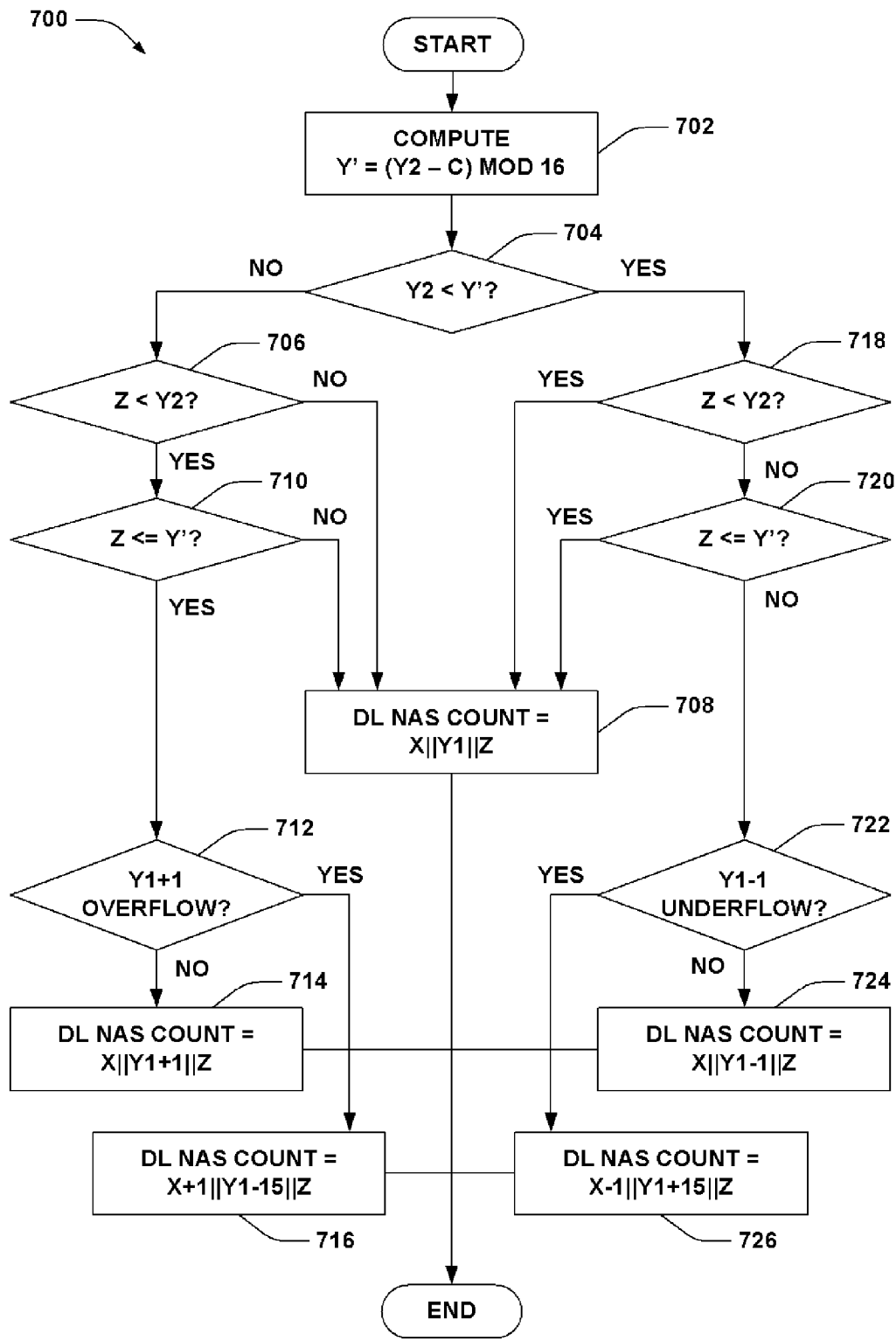
FIG. 7 illustrates an example methodology that generates a derived DL NAS count.

Referring to FIGS. 6-7, example methodologies relating to deriving a DL NAS count are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Referring to FIG. 6, an example methodology 600 is displayed that facilitates generating security keys by using a derived DL NAS count. At 602, a portion of a DL NAS count can be received from a remote network node during handover to a target network. As described, the portion can relate to a number of LSBs of the DL NAS count, which can have been used to generate security keys by a network component. At 604, a derived DL NAS count can be generated based at least in part on a locally stored DL NAS count and the portion of the DL NAS count. For example, as described above, the LSBs of the DL NAS count received can be combined with the remaining MSB of the locally stored DL NAS count. In addition, for example, a parameter can be utilized, as described, in generating the derived DL NAS count. The parameter, for example, can relate to a threshold maximum lower difference between the portion of the DL NAS count received (e.g., the LSBs) and a similar portion of the locally stored DL NAS count. At 606, one or more security keys can be generated for the target network based at least in part on the derived DL NAS count. For example, as described, the one or more security keys can be utilized for subsequent communications to facilitate seamless handover.

Turning to FIG. 7, an example methodology 700 is displayed that facilitates generating a derived DL NAS count. In this example, as described above, X can relate to a 16-bit overflow counter of a locally store DL NAS count, Y1 can relate to 4 MSBs of a sequence number of the locally stored DL NAS count, Y2 can relate to 4 LSBs of the sequence number of the locally store DL NAS count, and Z can relate 4 LSBs of a DL NAS count at a remote network node received in a handover message. In addition, C can relate to a parameter regarding a threshold maximum lower difference between Y2 and Z. It will be recognized that the present disclosure has broad application and is not limited to a particular size of DL NAS count, or the parts used to derive the DL NAS count (including the number of LSBs, the size of X, Y1, Y2, Z, C, etc.).

In deriving a DL NAS count, at 702, Y' can be computed as (Y2−C) mod 16. At 704, it can be determined whether Y2<Y'. If not, at 706, it can be determined whether Z<Y2. If not, at 708, the derived DL NAS count can be set to X∥Y1∥Z, where ∥ represents concatenation of the related bits. If Z<Y2, it can be determined at 710 whether Z≤Y'. If not, at 708, the derived DL NAS count can be set to X∥Y1∥Z. If Z≤Y', it can be determined at 712 whether Y1+1 will overflow (e.g., Y1=15). If not, at 714, the derived DL NAS count can be set to X∥Y1+1∥Z. If Y1+1 will overflow, at 716, the derived DL NAS count can be set to X+1∥Y1−15∥Z. At 704, if Y2<Y', at 718, it can be determined whether Z<Y2. If so, at 708, the derived DL NAS count can be set to X∥Y1∥Z. If not, at 720, it can be determined whether Z≤Y'. If so, at 708, the derived DL NAS count can be set to X∥Y1∥Z. If not, at 722, it can be determined whether Y1−1 will underflow (e.g., whether Y1=0). If not, at 724, the derived DL NAS count can be set to X∥Y1−1∥Z. If so, at 726, the derived DL NAS count can be set to X−1∥Y1+15∥Z.

It will be appreciated that, in accordance with one or more aspects described herein, inferences can be made regarding deriving the DL NAS count, generating related security keys, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 8:
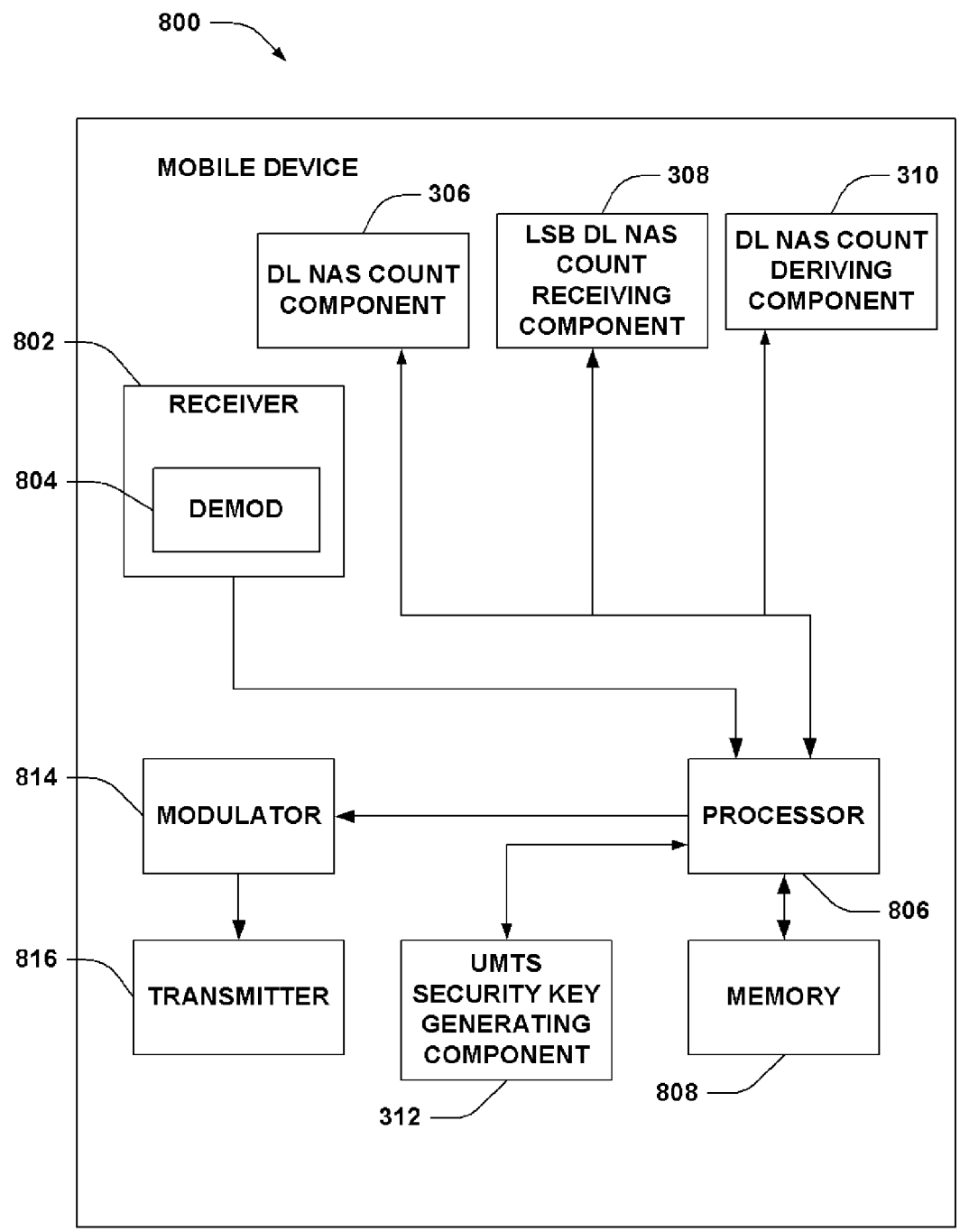
FIG. 8 illustrates an example mobile device that facilitates deriving a DL NAS count from a locally stored DL NAS count and a received portion of a DL NAS count.

FIG. 8 is an illustration of a mobile device 800 that facilitates deriving a DL NAS count. Mobile device 800 comprises a receiver 802 that receives a signal from, for instance, a receive antenna (not shown), performs typical actions on (e.g., filters, amplifies, downconverts, etc.) the received signal, and digitizes the conditioned signal to obtain samples. Receiver 802 can comprise a demodulator 804 that can demodulate received symbols and provide them to a processor 806 for channel estimation. Processor 806 can be a processor dedicated to analyzing information received by receiver 802 and/or generating information for transmission by a transmitter 816, a processor that controls one or more components of mobile device 800, and/or a processor that both analyzes information received by receiver 802, generates information for transmission by transmitter 816, and controls one or more components of mobile device 800.

Mobile device 800 can additionally comprise memory 808 that is operatively coupled to processor 806 and that can store data to be transmitted, received data, information related to available channels, data associated with analyzed signal and/or interference strength, information related to an assigned channel, power, rate, or the like, and any other suitable information for estimating a channel and communicating via the channel. Memory 808 can additionally store protocols and/or algorithms associated with estimating and/or utilizing a channel (e.g., performance based, capacity based, etc.).

It will be appreciated that the data store (e.g., memory 808) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), and the like. The memory 808 of the subject systems and methods is intended to comprise, without being limited to, these and any other suitable types of memory.

Processor 806 can further be operatively coupled to a DL NAS count component 306 that maintains a local DL NAS count, a LSB DL NAS count receiving component 308 that obtains n LSBs of a DL NAS count from a network component, a DL NAS count deriving component 310 that generates a derived DL NAS count based at least in part on the local DL NAS count and n LSBs of the DL NAS count obtained, and a UMTS security key generating component 312 that creates one or more UMTS security keys based at least in part on the derived DL NAS count. As described, DL NAS count deriving component 310 can further derive the DL NAS count based at least in part on a parameter related to a threshold maximum lower difference between the n LSBs obtained and n LSBs of the local DL NAS count. Mobile device 800 still further comprises a modulator 814 and transmitter 816 that respectively modulate and transmit signals to, for instance, a base station, another mobile device, etc. Although depicted as being separate from the processor 806, it is to be appreciated that the DL NAS count component 306, LSB DL NAS count receiving component 308, DL NAS count deriving component 310, UMTS security key generating component 312, demodulator 804, and/or modulator 814 can be part of the processor 806 or multiple processors (not shown).

Figure 9:
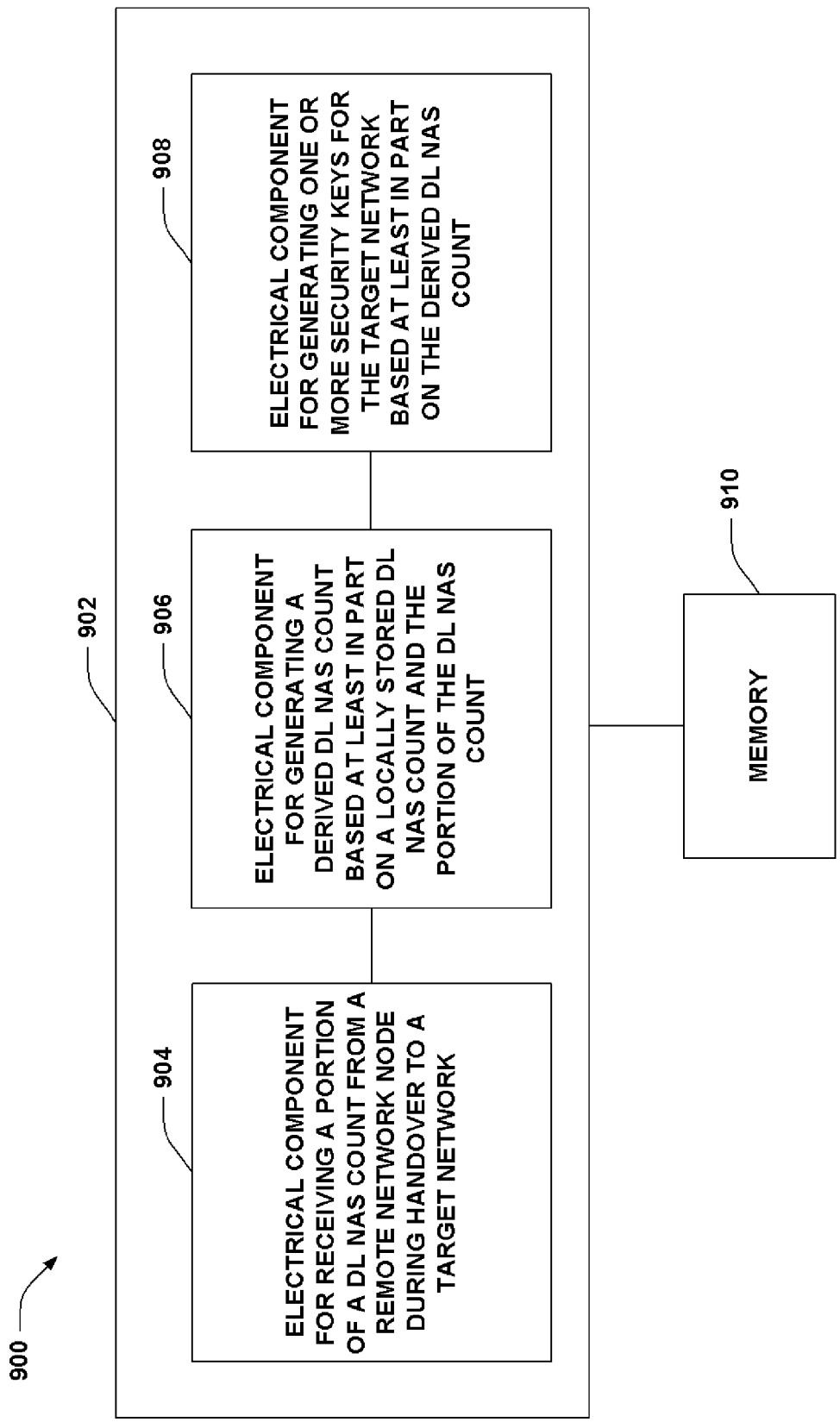
FIG. 9 illustrates an example system for deriving a DL NAS count.

With reference to FIG. 9, illustrated is a system 900 that derives a DL NAS count for generating security keys. For example, system 900 can reside at least partially within a base station, mobile device, etc. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. For instance, logical grouping 902 can include an electrical component for receiving a portion of a DL NAS count from a remote network node during handover to a target network 904. As described, for example, the portion of the DL NAS count can be n LSBs of the DL NAS count at the remote network node. Further, logical grouping 902 can comprise an electrical component for generating a derived DL NAS count based at least in part on a locally stored DL NAS count and the portion of the DL NAS count 906.

As described, in one example, the DL NAS count can be derived based at least in part on the portion of the DL NAS count received from the remote network node and a remaining portion of the locally stored DL NAS count (e.g., a remaining portion of MSB of the locally stored NAS count). In addition, for example, a parameter relating to a threshold maximum lower difference between the portion of the DL NAS count and a similar portion of the locally stored DL NAS count can be utilized in generating the derived DL NAS count. Furthermore, logical grouping 902 can comprise an electrical component for generating one or more security keys for the target network based at least in part on the derived DL NAS count 908. For example, in an aspect, electrical component 904 can include partial message count receiving component 108, an LSB DL NAS count receiving component 308, etc. as described above. In addition, for example, electrical component 906, in an aspect, can include a message count deriving component 110, a DL NAS count deriving component 310, etc., as described above. Moreover, in an example, electrical component 908, in an aspect, can include a UMTS security key generating component 312, etc. Additionally, system 900 can include a memory 910 that retains instructions for executing functions associated with the electrical components 904, 906, and 908. While shown as being external to memory 910, it is to be understood that one or more of the electrical components 904, 906, and 908 can exist within memory 910.

In one example, electrical components 904, 906, and 908 can comprise at least one processor, or each electrical component 904, 906, or 908 can be a corresponding module of at least one processor. Moreover, in an additional or alternative example, electrical components 904, 906, and 908 can be a computer program product comprising a computer readable medium, where each electrical component 904, 906, or 908 can be corresponding code.

Figure 10:
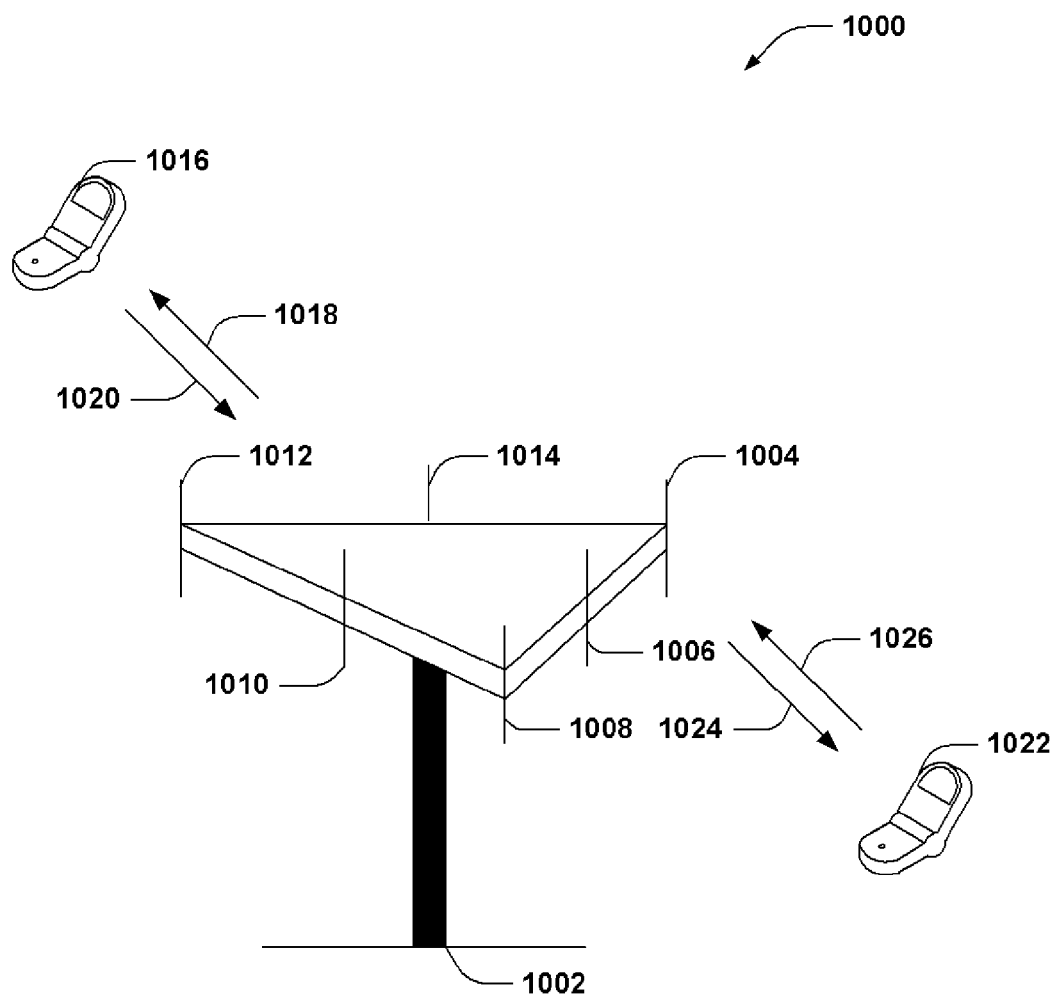
FIG. 10 illustrates an example wireless communication system in accordance with various aspects set forth herein.

Referring now to FIG. 10, a wireless communication system 1000 is illustrated in accordance with various embodiments presented herein. System 1000 comprises a base station 1002 that can include multiple antenna groups. For example, one antenna group can include antennas 1004 and 1006, another group can comprise antennas 1008 and 1010, and an additional group can include antennas 1012 and 1014. Two antennas are illustrated for each antenna group; however, more or fewer antennas can be utilized for each group. Base station 1002 can additionally include a transmitter chain and a receiver chain, each of which can in turn comprise a plurality of components associated with signal transmission and reception (e.g., processors, modulators, multiplexers, demodulators, demultiplexers, antennas, etc.), as is appreciated.

Base station 1002 can communicate with one or more mobile devices such as mobile device 1016 and mobile device 1022; however, it is to be appreciated that base station 1002 can communicate with substantially any number of mobile devices similar to mobile devices 1016 and 1022. Mobile devices 1016 and 1022 can be, for example, cellular phones, smart phones, laptops, handheld communication devices, handheld computing devices, satellite radios, global positioning systems, PDAs, and/or any other suitable device for communicating over wireless communication system 1000. As depicted, mobile device 1016 is in communication with antennas 1012 and 1014, where antennas 1012 and 1014 transmit information to mobile device 1016 over a forward link 1018 and receive information from mobile device 1016 over a reverse link 1020. Moreover, mobile device 1022 is in communication with antennas 1004 and 1006, where antennas 1004 and 1006 transmit information to mobile device 1022 over a forward link 1024 and receive information from mobile device 1022 over a reverse link 1026. In a frequency division duplex (FDD) system, forward link 1018 can utilize a different frequency band than that used by reverse link 1020, and forward link 1024 can employ a different frequency band than that employed by reverse link 1026, for example. Further, in a time division duplex (TDD) system, forward link 1018 and reverse link 1020 can utilize a common frequency band and forward link 1024 and reverse link 1026 can utilize a common frequency band.

Each group of antennas and/or the area in which they are designated to communicate can be referred to as a sector of base station 1002. For example, antenna groups can be designed to communicate to mobile devices in a sector of the areas covered by base station 1002. In communication over forward links 1018 and 1024, the transmitting antennas of base station 1002 can utilize beamforming to improve signal-to-noise ratio of forward links 1018 and 1024 for mobile devices 1016 and 1022. Also, while base station 1002 utilizes beamforming to transmit to mobile devices 1016 and 1022 scattered randomly through an associated coverage, mobile devices in neighboring cells can be subject to less interference as compared to a base station transmitting through a single antenna to all its mobile devices. Moreover, mobile devices 1016 and 1022 can communicate directly with one another using a peer-to-peer or ad hoc technology as depicted. According to an example, system 1000 can be a multiple-input multiple-output (MIMO) communication system.

Figure 11:
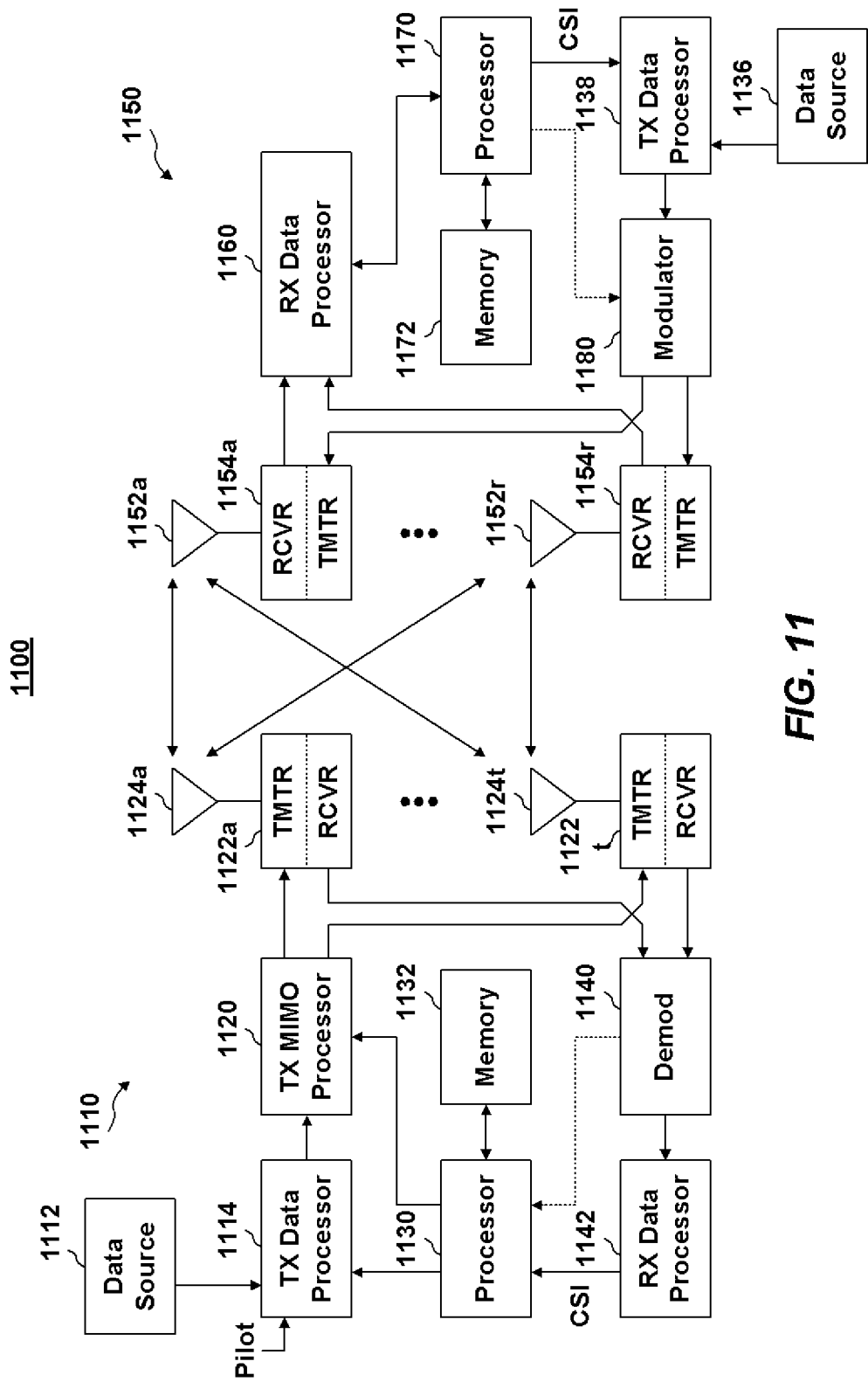
FIG. 11 illustrates an example wireless network environment that can be employed in conjunction with the various systems and methods described herein.

FIG. 11 shows an example wireless communication system 1100. The wireless communication system 1100 depicts one base station 1110 and one mobile device 1150 for sake of brevity. However, it is to be appreciated that system 1100 can include more than one base station and/or more than one mobile device, wherein additional base stations and/or mobile devices can be substantially similar or different from example base station 1110 and mobile device 1150 described below. In addition, it is to be appreciated that base station 1110 and/or mobile device 1150 can employ the systems (FIGS. 1-3 and 8-10), charts (FIG. 4), mobile devices, (FIG. 5), and/or methods (FIGS. 6-7) described herein to facilitate wireless communication there between. For example, components or functions of the systems and/or methods described herein can be part of a memory 1132 and/or 1172 or processors 1130 and/or 1170 described below, and/or can be executed by processors 1130 and/or 1170 to perform the disclosed functions.

At base station 1110, traffic data for a number of data streams is provided from a data source 1112 to a transmit (TX) data processor 1114. According to an example, each data stream can be transmitted over a respective antenna. TX data processor 1114 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1150 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1130.

The modulation symbols for the data streams can be provided to a TX MIMO processor 1120, which can further process the modulation symbols (e.g., for OFDM). TX MIMO processor 1120 then provides NT modulation symbol streams to NT transmitters (TMTR) 1122a through 1122t. In various embodiments, TX MIMO processor 1120 applies beamforming weights to the symbols of the data streams and to the antenna from which the symbol is being transmitted.

Each transmitter 1122 receives and processes a respective symbol stream to provide one or more analog signals, and further conditions (e.g., amplifies, filters, and upconverts) the analog signals to provide a modulated signal suitable for transmission over the MIMO channel. Further, NT modulated signals from transmitters 1122a through 1122t are transmitted from NT antennas 1124a through 1124t, respectively.

At mobile device 1150, the transmitted modulated signals are received by NR antennas 1152a through 1152r and the received signal from each antenna 1152 is provided to a respective receiver (RCVR) 1154a through 1154r. Each receiver 1154 conditions (e.g., filters, amplifies, and downconverts) a respective signal, digitizes the conditioned signal to provide samples, and further processes the samples to provide a corresponding "received" symbol stream.

An RX data processor 1160 can receive and process the NR received symbol streams from NR receivers 1154 based on a particular receiver processing technique to provide NT "detected" symbol streams. RX data processor 1160 can demodulate, deinterleave, and decode each detected symbol stream to recover the traffic data for the data stream. The processing by RX data processor 1160 is complementary to that performed by TX MIMO processor 1120 and TX data processor 1114 at base station 1110.

A processor 1170 can periodically determine which precoding matrix to utilize as discussed above. Further, processor 1170 can formulate a reverse link message comprising a matrix index portion and a rank value portion.

The reverse link message can comprise various types of information regarding the communication link and/or the received data stream. The reverse link message can be processed by a TX data processor 1138, which also receives traffic data for a number of data streams from a data source 1136, modulated by a modulator 1180, conditioned by transmitters 1154a through 1154r, and transmitted back to base station 1110.

At base station 1110, the modulated signals from mobile device 1150 are received by antennas 1124, conditioned by receivers 1122, demodulated by a demodulator 1140, and processed by a RX data processor 1142 to extract the reverse link message transmitted by mobile device 1150. Further, processor 1130 can process the extracted message to determine which precoding matrix to use for determining the beamforming weights.

Processors 1130 and 1170 can direct (e.g., control, coordinate, manage, etc.) operation at base station 1110 and mobile device 1150, respectively. Respective processors 1130 and 1170 can be associated with memory 1132 and 1172 that store program codes and data. Processors 1130 and 1170 can also perform computations to derive frequency and impulse response estimates for the uplink and downlink, respectively.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of wireless communication, comprising:
   receiving a portion of a downlink (DL) non-access stratum (NAS) count from a remote network node during handover to a target network;
   generating a derived DL NAS count based at least in part on a locally stored DL NAS count and the portion of the DL NAS count; and
   generating one or more security keys for the target network based at least in part on the derived DL NAS count;
   wherein the generating the derived DL NAS count is further based at least in part on at least one parameter related to a threshold maximum lower difference between the portion of the DL NAS count and a similar portion of the locally stored DL NAS count.

2. The method of claim 1, further comprising determining the at least one parameter based at least in part on one or more communication metrics related to communicating with the remote network node.

3. The method of claim 2, wherein the determining the at least one parameter comprises determining a number of NAS messages received from the remote network node over a time interval.

4. The method of claim 1, wherein the generating the derived DL NAS count further comprises:
   calculating a value Y' according to an equation (Y2−C) mod 16, wherein Y2 corresponds to a defined number of least significant bits (LSBs) of the locally stored DL NAS count, and wherein C corresponds to the at least one parameter; and
   comparing Y' to Y2.

5. The method of claim 4, wherein the generating the derived DL NAS count further comprises comparing Y2 to Z, wherein Z corresponds to the defined number of LSBs of the DL NAS count received from the remote network node.

6. An apparatus for deriving a message count, comprising:
   at least one processor configured to:
      obtain a portion of a downlink (DL) non-access stratum (NAS) count from a remote network node during handover to a target network;
      generate a derived DL NAS count based at least in part on a locally stored DL NAS count and the portion of the DL NAS count; and
      create one or more security keys for the target network based at least in part on the derived DL NAS count; and
   a memory coupled to the at least one processor;
   wherein the at least one processor generates the derived DL NAS count further based at least in part on a parameter related to a threshold maximum lower difference between the portion of the DL NAS count and a similar portion of the locally stored DL NAS count.

7. The apparatus of claim 6, wherein the at least one processor is further configured to determine the parameter based at least in part on one or more communication metrics related to communicating with the remote network node.

8. The apparatus of claim 7, wherein the parameter relates to a number of NAS messages received from the remote network node over a time interval.

9. The apparatus of claim 6, wherein the at least one processor generates the derived DL NAS count further by:
calculating a value Y' according to an equation (Y2−C) mod 16, wherein Y2 corresponds to a defined number of least significant bits (LSBs) of the locally stored DL NAS count, and wherein C corresponds to the at least one parameter; and
comparing Y' to Y2.

10. The apparatus of claim 9, wherein the at least one processor generates the derived DL NAS count further by comparing Y2 to Z, wherein Z corresponds to the defined number of LSBs of the DL NAS count received from the remote network node.

11. An apparatus for deriving a message count, comprising:
means for receiving a portion of a downlink (DL) non-access stratum (NAS) count from a remote network node during handover to a target network;
means for generating a derived DL NAS count based at least in part on a locally stored DL NAS count and the portion of the DL NAS count; and
means for generating one or more security keys for the target network based at least in part on the derived DL NAS count;
wherein the means for generating generates the derived DL NAS count further based at least in part on a parameter related to a threshold maximum lower difference between the portion of the DL NAS count and a similar portion of the locally stored DL NAS count.

12. The apparatus of claim 11, further comprising means for determining the parameter based at least in part on one or more communication metrics related to the remote network node.

13. The apparatus of claim 12, wherein the means for determining determines the parameter based at least in part on determining a number of NAS messages received from the remote network node over a time interval.

14. The apparatus of claim 11, wherein the means for generating generates the derived DL NAS count further by:
calculating a value Y' according to an equation (Y2−C) mod 16, wherein Y2 corresponds to a defined number of least significant bits (LSBs) of the locally stored DL NAS count, and wherein C corresponds to the at least one parameter; and
comparing Y' to Y2.

15. The apparatus of claim 14, wherein the means for generating generates the derived DL NAS count further by comparing Y2 to Z, wherein Z corresponds to the defined number of LSBs of the DL NAS count received from the remote network node.

16. A computer program product for deriving a message count, comprising:
a non-transitory computer-readable medium, comprising:
code for causing at least one computer to obtain a portion of a downlink (DL) non-access stratum (NAS) count from a remote network node during handover to a target network;
code for causing the at least one computer to generate a derived DL NAS count based at least in part on a locally stored DL NAS count and the portion of the DL NAS count; and
code for causing the at least one computer to create one or more security keys for the target network based at least in part on the derived DL NAS count;
wherein the code for causing the at least one computer to generate generates the derived DL NAS count further based at least in part on a parameter related to a threshold maximum lower difference between the portion of the DL NAS count and a similar portion of the locally stored DL NAS count.

17. The computer program product of claim 16, wherein the non-transitory computer-readable medium further comprises code for causing the at least one computer to determine the parameter based at least in part on one or more communication metrics related to communicating with the remote network node.

18. The computer program product of claim 17, wherein the parameter relates to a number of NAS messages received from the remote network node over a time interval.

19. The computer program product of claim 16, wherein the code for causing the at least one computer to generate generates the derived DL NAS count further by:
calculating a value Y' according to an equation (Y2−C) mod 16, wherein Y2 corresponds to a defined number of least significant bits (LSBs) of the locally stored DL NAS count, and wherein C corresponds to the at least one parameter; and
comparing Y' to Y2.

20. The computer program product of claim 19, wherein the code for causing the at least one computer to generate generates the derived DL NAS count further by comparing Y2 to Z, wherein Z corresponds to the defined number of LSBs of the DL NAS count received from the remote network node.

21. An apparatus for deriving a message count, comprising:
a least significant bit (LSB) downlink (DL) non-access stratum (NAS) count receiving processor for obtaining a portion of a DL NAS count from a remote network node during handover to a target network;
a DL NAS count deriving processor for generating a derived DL NAS count based at least in part on a locally stored DL NAS count and the portion of the DL NAS count; and
a universal mobile telecommunications system (UMTS) security key generating component for creating one or more security keys for the target network based at least in part on the derived DL NAS count;
wherein the DL NAS count deriving processor generates the derived DL NAS count further based at least in part on a parameter related to a threshold maximum lower difference between the portion of the DL NAS count and a similar portion of the locally stored DL NAS count.

22. The apparatus of claim 21, further comprising a threshold parameter determining component for determining the parameter based at least in part on one or more communication metrics related to the remote network node.

23. The apparatus of claim 22, wherein the threshold parameter determining component determines the parameter based at least in part on determining a number of NAS messages received from the remote network node over a time interval.

* * * * *